(12) United States Patent
Pang (10) Patent No.: US 12,108,154 B2
(45) Date of Patent: Oct. 1, 2024

(54) CAMERA MODULE FOR ANTI-SHAKE USING A DRIVE COIL AND ELECTRONIC DEVICE

(71) Applicant: VIVO MOBILE COMMUNICATION CO., LTD., Dongguan (CN)

(72) Inventor: Qinquan Pang, Dongguan (CN)

(73) Assignee: VIVO Mobile Communication Co., Ltd., Guangdong (CN)

(*) Notice: Subject to any disclaimer, the term of this patent is extended or adjusted under 35 U.S.C. 154(b) by 95 days.

(21) Appl. No.: 17/966,196

(22) Filed: Oct. 14, 2022

(65) Prior Publication Data

US 2023/0036225 A1 Feb. 2, 2023

Related U.S. Application Data

(63) Continuation of application No. PCT/CN2021/086871, filed on Apr. 13, 2021.

(30) Foreign Application Priority Data

Apr. 17, 2020 (CN) .......................... 202010306951.7

(51) Int. Cl.
*H04N 23/68* (2023.01)

(52) U.S. Cl.
CPC ....... *H04N 23/687* (2023.01); *H04N 23/6812* (2023.01)

(58) Field of Classification Search
CPC .. H04N 23/687; H04N 23/6812; H04N 23/57; H04N 23/54; H04N 23/55; G03B 2205/0007; G03B 2205/0023; G03B 2205/0069; G03B 5/00; G03B 30/00; G03B 3/10; G03B 13/34; G03B 17/12
See application file for complete search history.

(56) References Cited

U.S. PATENT DOCUMENTS

| 8,571,399 | B2 | 10/2013 | Minamisawa et al. | |
|---|---|---|---|---|
| 9,910,290 | B2 | 3/2018 | Dong et al. | |
| 2006/0269263 | A1* | 11/2006 | Kim | H04N 23/68 348/E5.046 |
| 2011/0158616 | A1* | 6/2011 | Chiang | G03B 5/02 359/557 |
| 2015/0103239 | A1 | 4/2015 | Kikuchi | |

(Continued)

FOREIGN PATENT DOCUMENTS

| CN | 102177465 B | 6/2014 |
|---|---|---|
| CN | 204945591 U | 1/2016 |

(Continued)

*Primary Examiner* — Padma Haliyur
(74) *Attorney, Agent, or Firm* — The Webb Law Firm (57) ABSTRACT

A camera module includes a lens module and an anti-shake module. The anti-shake module includes an outer frame and a first drive component; the lens module is rotatably disposed inside the outer frame; the first drive component includes a first drive coil and a first magnetic element, where one of the first drive coil and the first magnetic element is disposed on the outer frame, and another of the first drive coil and the first magnetic element is disposed on the lens module; the first drive coil is located in a magnetic field of the first magnetic element; and in a case that the first drive coil is energized, the lens module is able to rotate relative to the outer frame.

20 Claims, 6 Drawing Sheets

(56) References Cited

U.S. PATENT DOCUMENTS

| | | | |
|---|---|---|---|
| 2016/0025995 A1* | 1/2016 | Ariji | ................. G03B 5/02 |
| | | | 359/557 |
| 2018/0329170 A1 | 11/2018 | Huang et al. | |
| 2019/0394399 A1 | 12/2019 | Abe et al. | |
| 2020/0012170 A1 | 1/2020 | Hong et al. | |
| 2020/0225443 A1 | 7/2020 | Lim et al. | |
| 2021/0041717 A1* | 2/2021 | Takei | ............ G02B 27/646 |
| 2021/0203815 A1* | 7/2021 | Kim | ................. H04N 23/54 |
| 2021/0223663 A1 | 7/2021 | Minamisawa | |
| 2022/0174189 A1* | 6/2022 | Kuo | ............ H02K 41/0356 |
| 2022/0224806 A1 | 7/2022 | Lu et al. | |

FOREIGN PATENT DOCUMENTS

| | | |
|---|---|---|
| CN | 105573014 A | 5/2016 |
| CN | 210157254 U | 3/2020 |
| CN | 111510598 A | 8/2020 |
| CN | 110677567 B | 11/2020 |
| JP | 2010096863 A | 4/2010 |
| JP | 2013-15610 A | 1/2013 |
| JP | 2017-83523 A | 5/2017 |
| JP | 2019219564 A | 12/2019 |
| KR | 1020160064941 A | 6/2016 |
| KR | 1020200004513 A | 1/2020 |
| WO | 2017032965 A1 | 3/2017 |
| WO | 2019221038 A1 | 11/2019 |
| WO | WO-2021031577 A1 * | 2/2021 ........... G02B 27/646 |

\* cited by examiner

CAMERA MODULE FOR ANTI-SHAKE USING A DRIVE COIL AND ELECTRONIC DEVICE

CROSS-REFERENCE TO RELATED APPLICATIONS

This application is a Bypass Continuation Application of PCT/CN2021/086871 filed Apr. 13, 2021, which claims priority to Chinese Patent Application No. 202010306951.7 filed Apr. 17, 2020, the disclosures of which are hereby incorporated by reference in their entirety.

BACKGROUND OF THE INVENTION

Field of the Invention

The present application relates to the field of communications technologies, and in particular, to a camera module and an electronic device.

Description of Related Art

With the increasingly wide application of photographing and shooting functions on mobile phone terminals, users have higher requirements on imaging quality of mobile phone camera. During photographing or shooting by using the mobile phone camera, to prevent reduction in imaging quality of the mobile phone camera due to a fuzzy image of a lens module caused by shaking during holding or walking, the lens module of the mobile phone camera is equipped with a corresponding anti-shake stabilization system to correct image offset of the lens module during shaking and guarantee the imaging quality of the mobile phone camera.

SUMMARY OF THE INVENTION

According to a first aspect, the present application provides a camera module. The camera module includes a lens module and an anti-shake module, where the anti-shake module includes an outer frame and a first drive component; the lens module is rotatably disposed inside the outer frame; the first drive component includes a first drive coil and a first magnetic element, where one of the first drive coil and the first magnetic element is disposed on the outer frame, and another of the first drive coil and the first magnetic element is disposed on the lens module; the first drive coil is located in a magnetic field of the first magnetic element; and in a case that the first drive coil is energized, the lens module is able to rotate relative to the outer frame.

According to a second aspect, the present application provides an electronic device. The electronic device includes the foregoing camera module.

BRIEF DESCRIPTION OF DRAWINGS

The drawings described herein are intended for understanding of the present application and constitute part of the present application. Example embodiments of the present application and descriptions thereof are intended to explain the present application, but do not constitute any inappropriate limitation on the present application. In the accompanying drawings.

Reference signs are described as follows:
100. outer frame; 101. second drive coil; 1011. first sensor; 102. first drive coil; 1021. second sensor; 110. first rotating base; 120. second rotating base; 103. second printed circuit board; 200. inner frame; 210. first mounting base; 220. second mounting base; 300. lens; 400. third drive component; 410. second magnetic element; 4101. third magnetic portion; 4102. fourth magnetic portion; 411. third drive coil; 420. first magnetic element; 430. third magnetic element; 431. fifth drive coil; 440. mounting portion; 450. window; 500. circuit board; 501. first printed circuit board; and 510. photosensitive chip.

DESCRIPTION OF THE INVENTION

To make the objectives, technical solutions, and advantages of the present application clearer, the following clearly describes the technical solutions of the present application with reference to embodiments of the present application and corresponding drawings. Apparently, the described embodiments are merely some rather than all the embodiments of the present application. All other embodiments obtained by persons of ordinary skill in the art based on the embodiments of the present application shall fall within the protection scope of the present application.

At present, an anti-shake stabilization system of a mobile phone mainly corrects image offset of a lens module in a manner of panning or tilting a lens. However, the manner of panning or tilting the lens enables the lens to relatively move or tilt relative to a photosensitive chip, and therefore a diameter of the lens is optically required to be larger than a size of the photosensitive chip to cover an imaging area of the photosensitive chip during relatively moving or tilting, and therefore the lens needs to be designed with a large diameter.

The technical solutions disclosed in the embodiments of the present application are described in detail below with reference to the accompanying drawings.

Referring to FIG. 1 to FIG. 10, the embodiments of the present application disclose a camera module, where the disclosed camera module includes a lens module and an anti-shake module.

As an anti-shake function component of the lens module, the anti-shake module is capable of correcting image offset of the lens module, so as to prevent shaking from influencing imaging quality of images.

The anti-shake module disclosed in the embodiments of the present application includes an outer frame 100 and a first drive component. The lens module is rotatably disposed inside the outer frame 100. For example, the lens module is able to rotate relative to the outer frame 100 in the outer frame 100.

The first drive component includes a first drive coil 102 and a first magnetic element 420, where one of the first drive coil 102 and the first magnetic element 420 is disposed on the outer frame 100, and another of the first drive coil 102 and the first magnetic element 420 is disposed on the lens module; and the first drive coil 102 is located in a magnetic field of the first magnetic element 420, so that when a current flows through the first drive coil 102, the magnetic field of the first magnetic element 420 is able to generate an Ampere force to act on the first drive coil 102. The first magnetic element 420 may be a permanent magnet or an electromagnet.

In a case that the first drive coil 102 is energized, the lens module is able to rotate relative to the outer frame 100. For example, the magnetic field of the first magnetic element 420 enables the first drive coil 102 to be subject to the Ampere force from the first magnetic element 420 in a case that a current is applied to the first drive coil 102; and intensity and direction of the applied current can be adjusted to adjust magnitude and direction of the Ampere force acting on the first drive coil 102.

Therefore, the Ampere force acting on the first drive coil 102 can be used for rotating and tuning the lens module, so that image offset during shaking is corrected, thereby enhancing imaging quality of the lens module.

Compared with a manner of correcting image offset of a lens module by panning or tilting a lens 300, the camera module disclosed in the embodiments of the present application can not only correct image offset during shaking and enhance imaging quality of the lens module, but also enable a relative position between the lens 300 and a photosensitive chip 510 to remain unchanged during rotating and reduce a diameter size designed for the lens 300. This optimizes an inner structural layout of an electronic device.

To enable the lens module to implement angle compensation in any direction, in an optional solution, the anti-shake module further includes an inner frame 200 and a second drive component, where the inner frame 200 is rotatably disposed inside the outer frame 100. For example, the inner frame 200 is disposed on the outer frame 100 in a manner of rotating around a first rotating shaft, the lens module is disposed on the inner frame 200 in a manner of rotating around a second rotating shaft, and rotating axes of the first rotating shaft and the second rotating shaft intersect with each other, so that the lens module and the inner frame 200 do not interfere with each other. The lens module is capable of rotating around the second rotating shaft alone and is also capable of rotating, along with the inner frame 200, around the first rotating shaft, thereby enabling the lens module to rotate and tune in any direction to prevent shake of the lens module within a larger range.

The second drive component includes a second drive coil 101 and a second magnetic element 410, where one of the second drive coil 101 and the second magnetic element 410 is disposed on the outer frame 100, and another of the second drive coil 101 and the second magnetic element 410 is disposed on the inner frame 200 or the lens module. The second drive coil 101 is located in a magnetic field of the second magnetic element 410, so that when a current flows through the second drive coil 101, the magnetic field of the second magnetic element 410 is able to generate an Ampere force to act on the second drive coil 101. The second magnetic element 410 may be a permanent magnet or an electromagnet.

In a case that the second drive coil 101 is energized, the inner frame 200 and the lens module are able to rotate relative to the outer frame 100. For example the magnetic field of the second magnetic element 410 enables the second drive coil 101 to be subject to an Ampere force from the second magnetic element 410 in a case that a current is applied; and intensity and direction of the applied current can be adjusted to adjust magnitude and direction of the Ampere force acting on the second drive coil 101. Therefore, with reference to the foregoing description, the Ampere force acting on the second drive coil 101 and the first drive coil 102 can be used for rotating and tuning the lens module and the inner frame 200 respectively, and rotation and tuning of the lens module and the inner frame 200 do not interfere with each other. This implements rotation of the overall lens module in any direction. The lens module can correct image offset in any direction during shaking, thereby enhancing imaging quality of the lens module.

In the embodiments, the second drive coil 101, the first drive coil 102, the second magnetic element 410, and the first magnetic element 420 are not limited in types and arrangement positions. Certainly, they need to keep their corresponding arrangement relationships.

In an implementation, the second magnetic element 410 and the first magnetic element 420 are disposed in the lens module; the second magnetic element 410 and the first magnetic element 420 are located on a same side of the first rotating shaft and are located on two sides of the second rotating shaft; or the second magnetic element 410 and the first magnetic element 420 are located on a same side of the second rotating shaft and are located on two sides of the first rotating shaft. Alternatively, the second drive coil 101 and the first drive coil 102 may be disposed in the lens module. Correspondingly, the second magnetic element 410 and the first magnetic element 420 are disposed on the outer frame 100. In addition, the second magnetic element 410 and the first magnetic element 420 may also be located on a same side of the first rotating shaft and be located on two sides of the second rotating shaft respectively. For example, the lens module includes a lens 300 and a third drive component 400, where the lens 300 is movably disposed in the third drive component 400, and the lens 300 is able to adjust a focal length of the lens 300 by using the third drive component 400. Typically, the third drive component 400 is a voice coil actuator; during working, the voice coil actuator can provide a driving effect on the lens 300 to drive the lens 300 to move, thereby adjusting the focal length of the lens 300.

Figure 1:
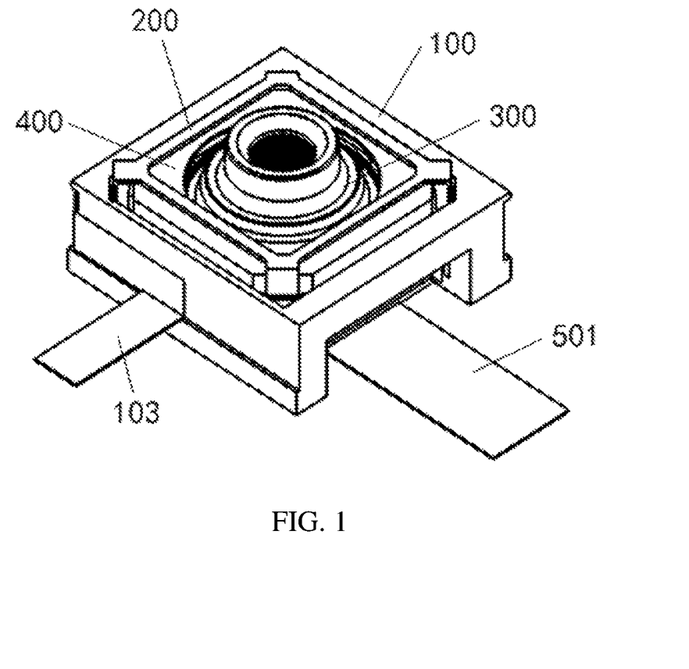
FIG. 1 is a schematic structural diagram of a camera module according to an embodiment of the present application.
Figure 2:
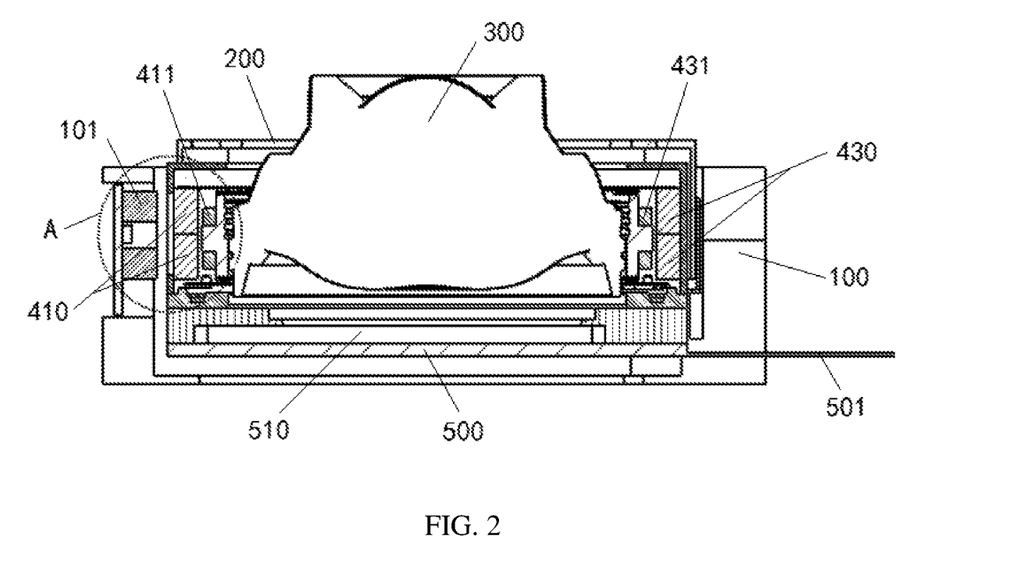
FIG. 2 is a schematic sectional structural diagram of a camera module according to an embodiment of the present application.
Figure 4:
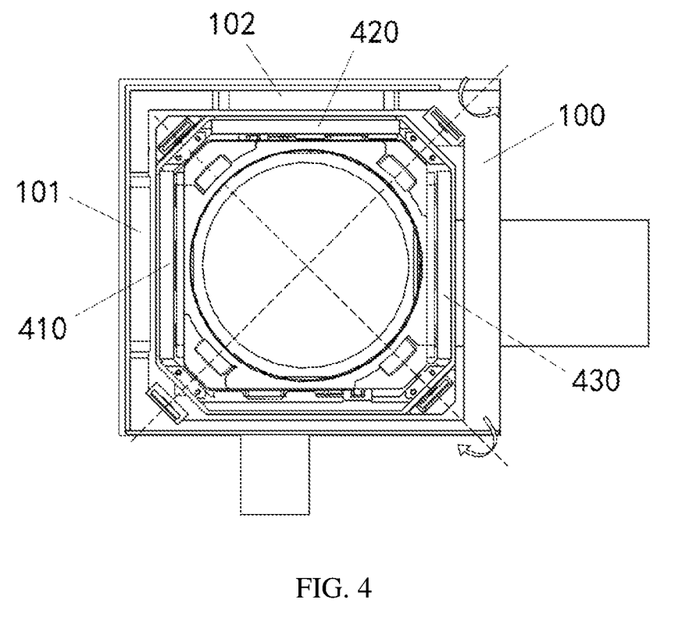
FIG. 4 is a schematic structural diagram of an outer frame and a third drive component according to an embodiment of the present application.

As shown in FIG. 2 and FIG. 4, the third drive component 400 may include a third drive coil 411 and a fourth drive coil. The second magnetic element 410 and the first magnetic element 420 are disposed on two sides of the lens 300 and have spacings for moving from the lens 300 respectively; and the third drive coil 411 and the fourth drive coil are disposed on an outer wall of the lens 300, where the third drive coil 411 is located on a side facing the second magnetic element 410, and the fourth drive coil is located on a side facing the first magnetic element 420. In this case, when the third drive coil 411 and the fourth drive coil are energized, Ampere force generated by the second magnetic element 410 and the third drive coil 411, and by the first magnetic element 420 and the fourth drive coil are used for controlling the lens 300 to rotate to adjust the focal length of the lens 300.

It can be seen from the foregoing description that, optionally, the second drive coil 101 and the third drive coil 411 may share the second magnetic element 410, and the first drive coil 102 and the fourth drive coil may share the first magnetic element 420, so that space in the camera module is fully utilized without disposing an additional magnetic element. Certainly, a structure of the third drive component 400 is not limited in the embodiments. The third drive component 400 may also include an independent magnetic element, so that the first magnetic element 420 and the second magnetic element 410 may be disposed outside the third drive component 400.

Figure 3:
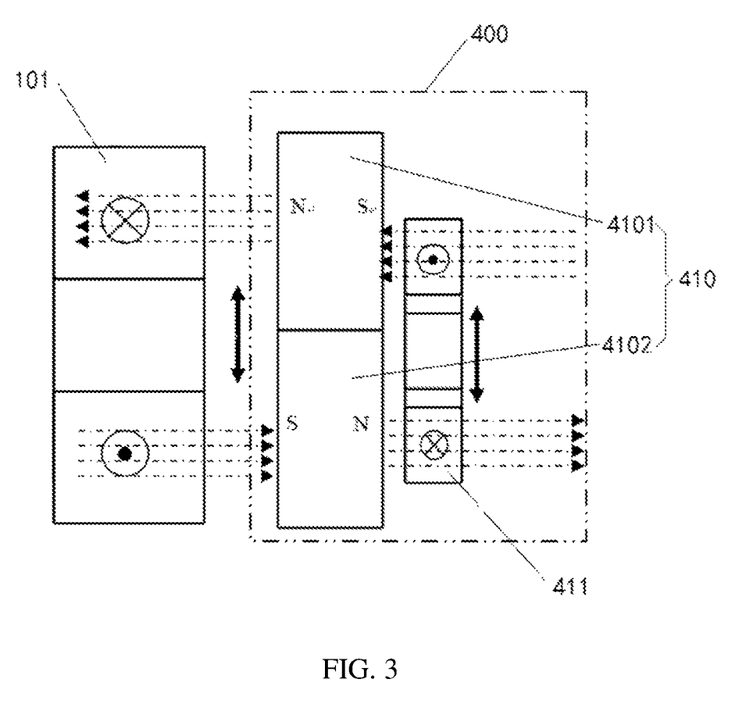
FIG. 3 is a schematic diagram of Ampere force action principle of part A in FIG. 2.

As mentioned above, the second magnetic element 410 and the first magnetic element 420 may be located on a same side of the second rotating shaft and be located on two sides of the first rotating shaft respectively. The second drive coil 101 and the first drive coil 102 may be disposed on the outer frame 100, the second drive coil 101 and the second magnetic element 410 are located at opposite positions, and the first drive coil 102 and the first magnetic element 420 are located at opposite positions. Referring to FIG. 3 and FIG. 4, a rotation and tuning process of the lens module may be described by using the following examples.

When forward currents of equal intensity are applied to the second drive coil 101 and the first drive coil 102 respectively, according to the left-hand rule, the second drive coil 101 and the first drive coil 102 are subject to upward Ampere force. As the outer frame 100 is fixed, the second magnetic element 410 and the first magnetic element 420 are subject to counter-acting force from the second drive coil 101 and the first drive coil 102 to push the lens module downward to forwardly rotate, along with the inner frame 200, around the second rotating shaft and tune.

When reverse currents of equal intensity are applied to the second drive coil 101 and the first drive coil 102 respectively, according to the left-hand rule, the second drive coil 101 and the first drive coil 102 are subject to downward Ampere force. As the outer frame 100 is fixed, the second magnetic element 410 and the first magnetic element 420 are subject to counter-acting force from the second drive coil 101 and the first drive coil 102 to push the lens module upward to reversely rotate, along with the inner frame 200, around the second rotating shaft and tune.

When a forward current is applied to the second drive coil 101, a reverse current is applied to the first drive coil 102, and the forward current and the reverse current may be the same in intensity, according to the left-hand rule, the second drive coil 101 is subject to an upward Ampere force and the first drive coil 102 is subject to a downward Ampere force. As the outer frame 100 is fixed, the second magnetic element 410 is subject to a counter-acting force from the second drive coil 101 to push the lens module downward, and the first magnetic element 420 is subject to a counter-acting force from the first drive coil 102 to push the lens module upward, thereby enabling the lens module to forwardly rotate around the first rotating shaft and tune.

When a reverse current is applied to the second drive coil 101, a forward current is applied to the first drive coil 102, and the reverse current and the forward current may be the same in intensity, according to the left-hand rule, the second drive coil 101 is subject to a downward Ampere force and the first drive coil 102 is subject to an upward Ampere force. As the outer frame 100 is fixed, the second magnetic element 410 is subject to a counter-acting force from the second drive coil 101 to push the lens module upward, and the first magnetic element 420 is subject to a counter-acting force from the first drive coil 102 to push the lens module downward, thereby enabling the lens module to reversely rotate around the first rotating shaft and tune.

When the second drive coil 101 and the first drive coil 102 are deenergized, no current flows through the second drive coil 101 and the first drive coil 102, so that the second magnetic element 410 and the first magnetic element 420 generate no Ampere force, thereby enabling the lens module and the inner frame to be in a stationary state.

Figure 7:
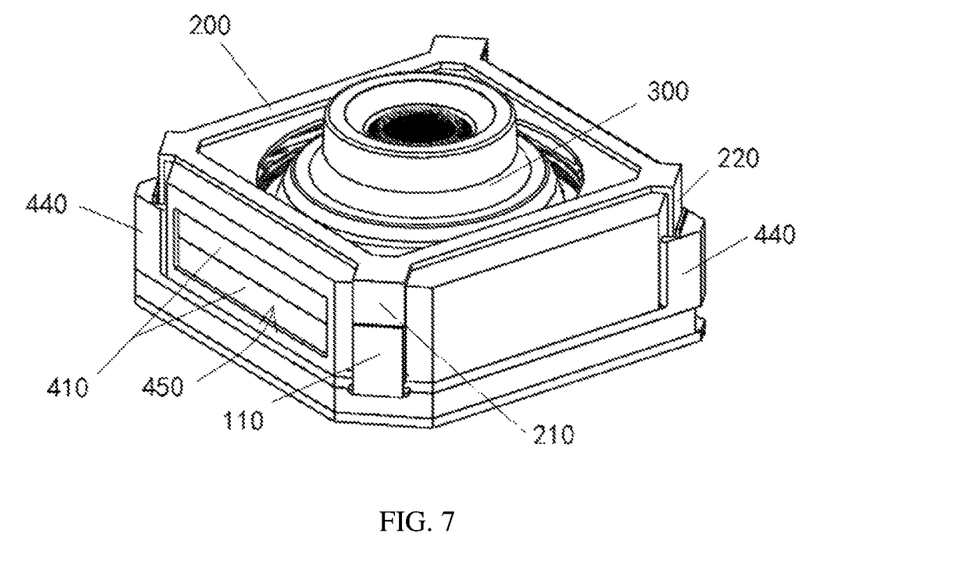
FIG. 7 is a schematic diagram of an assembly structure of an inner frame and a camera module according to an embodiment of the present application.

In an optional solution, referring to FIG. 2, FIG. 3, and FIG. 7, the second magnetic element 410 includes a third magnetic portion 4101 and a fourth magnetic portion 4102 with reverse magnetic poles, where an N pole of the third magnetic portion 4101 and an S pole of the fourth magnetic portion 4102 respectively face coil portions that have reverse electron migration directions and are of the second drive coil 101 when the second drive coil 101 is energized, and an S pole of the third magnetic portion 4101 and an N pole of the fourth magnetic portion 4102 respectively face coil portions that have reverse electron migration directions and are of the third drive coil 411 when the third drive coil 411 is energized; and the first magnetic element 420 includes a first magnetic portion and a second magnetic portion with reverse magnetic poles, where an N pole of the first magnetic portion and an S pole of the second magnetic portion respectively face coil portions that have reverse electron migration directions and are of the first drive coil 102 when the first drive coil 102 is energized, and an S pole of the first magnetic portion and an N pole of the second magnetic portion respectively face coil portions that have reverse electron migration directions and are of the fourth drive coil 421 when the fourth drive coil 421 is energized. Therefore, the magnetic fields of the second magnetic element 410 and the first magnetic element 420 are able to better act on portions with reverse electron migration directions of corresponding conductive coils, so that the overall coil may be subject to an Ampere force. The third magnetic portion 4101 and the fourth magnetic portion 4102 may be two side-by-side magnets with reverse magnetic poles.

In addition, the third drive component 400 may further include a housing, where the housing is provided with an accommodating cavity and an opening that communicates with the accommodating cavity. One end of the lens 300 is located in the accommodating cavity, and another end of the lens 300 is telescopically disposed in the opening. The another end of the lens 300 is able to move for zooming through the opening. A photosensitive chip 510 and a circuit board 500 are disposed on a side of the lens 300 away from the opening. The photosensitive chip 510 is disposed on the circuit board 500 and faces the lens 300. The second magnetic element 410 and the first magnetic element 420 are disposed on an inner side wall of the accommodating cavity, so that the housing can not only provide a carrier base for disposing components such as the conductive coils, the second magnetic element 410, the first magnetic element 420, the photosensitive chip 510, and the circuit board 500, but also guarantee both protection and appearance performance.

In addition, to prevent the housing from obstructing the magnetic fields of the second magnetic element 410 and the first magnetic element 420, windows 450 are respectively opened at positions that are on side surfaces of the housing and are corresponding to the second magnetic element 410 and the first magnetic element 420, thereby enabling the magnetic fields of the second magnetic element 410 and the first magnetic element 420 to pass through the housing through corresponding windows 450 and respectively act on the corresponding second drive coil 101 and first drive coil 102.

To enhance stability of the third drive component 400 moving the lens 300 for zooming, the third drive component 400 further includes a third magnetic element 430 and a fifth drive coil 431. As shown in FIG. 2 and FIG. 4, the fifth drive coil 431 is disposed on the lens 300 and is located on a side opposite to the third drive coil 411; and the third magnetic element 430 is disposed on the inner side wall of the accommodating cavity and is opposite the second magnetic element 410. Therefore, two opposite sides of the lens 300 can both be subject to acting force during moving of the lens 300 for zooming by the third drive component 400, thereby making the moving more stable.

The camera module disclosed in the embodiments of the present application may further include an angle detection module, where the angle detection module is configured to detect a rotation angle of at least one of the inner frame 200 or the lens module. It should be understood that rotation angles of the inner frame 200 and the lens module are obtained via the angle detection module, so that it can be determined whether the lens module rotates in place when implementing anti-shake compensation.

For example, the angle detection module may include a first sensor 1011 and a second sensor 1021 that are configured to detect the inner frame 200 and the lens module respectively. One of the first sensor 1011 and the second sensor 1021 is disposed on the first drive coil 102, and another of the first sensor 1011 and the second sensor 1021 is disposed on the second drive coil 101. Optionally, the first sensor 1011 and the second sensor 1021 may be Hall sensors.

For example, based on the first sensor 1011 and the second sensor 1021, rotation angles of the inner frame 200 and the lens module can be detected. It should be noted that measuring rotation angles by using Hall components is a conventional technology in the art, and details are not described herein. Certainly, the first sensor 1011 and the second sensor 1021 may also be other types of angle detection elements such as angle sensors and gyroscopes.

The angle detection module may further include a processor. The first sensor 1011 and the second sensor 1021 are connected to signal input terminals of the processor respectively. Control output terminals of the processor are connected to the second drive coil 101 and the first drive coil 102 respectively, and the processor is able to control currents of the second drive coil 101 and the first drive coil 102 according to the first sensor 1011 and the second sensor 1021. Therefore, the first sensor 1011, the second sensor 1021, the processor, the second drive coil 101, and the first drive coil 102 constitute a closed-loop control system, so that accurate control of rotation and tuning of the lens module and the inner frame 200 can be implemented.

Figure 10:
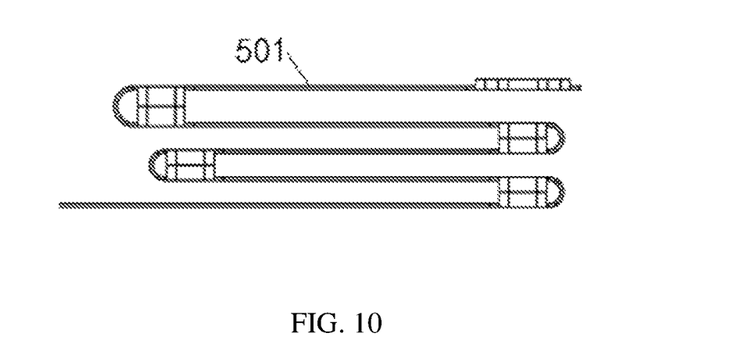
FIG. 10 is a side view of a first printed circuit board according to an embodiment of the present application.

In addition, the circuit board 500 in the lens module is provided with a first printed circuit board 501 and is conveniently connected to a mainboard of an electronic device via the first printed circuit board 501. As shown in FIG. 10, to avoid influence of rotation of the lens module on the circuit board, the first printed circuit board 501 may be a flexible printed circuit board and be folded and bent to an S shape, and a connector may be disposed on a connection terminal of the first printed circuit board 501.

The second drive coil 101 and the first drive coil 102 may be disposed on a second printed circuit board 103 to be conveniently connected to the processor or the mainboard of the electronic device via the second printed circuit board 103. The second printed circuit board 103 may be a flexible printed circuit board, and a connector may be disposed on a connection terminal of the second printed circuit board 103.

Figure 6:
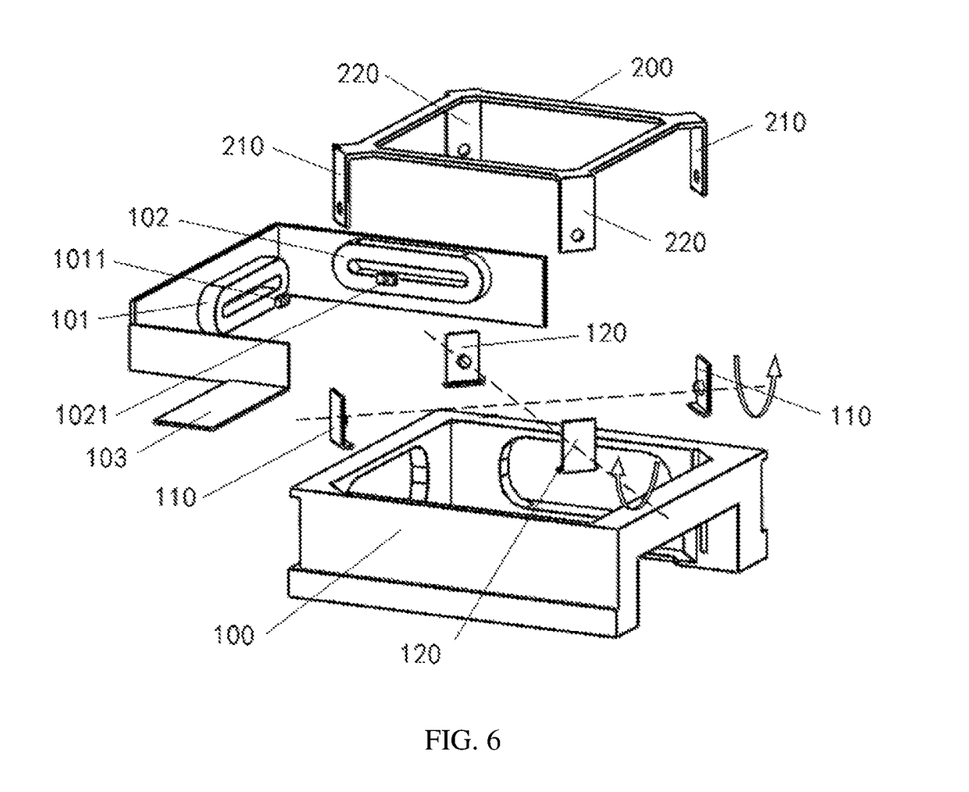
FIG. 6 is a schematic exploded view of an anti-shake module according to an embodiment of the present application.

In the camera module disclosed in the embodiments of the present application, to facilitate rotating assembly between the inner frame 200 and the outer frame 100 and between the inner frame 200 and the lens module, as shown in FIG. 6, the inner frame 200 includes two first mounting bases 210. Correspondingly, first rotating bases 110 are respectively disposed at positions that are on an inner side wall of the outer frame 100 and are corresponding to the first mounting bases 210; one of the first mounting bases 210 corresponds to one of the first rotating bases 110; and one of the first mounting base 210 and the first rotating base 110 that correspond to each other is provided with a first convex portion, and another of the first mounting base 210 and the first rotating base 110 is provided with a first concave portion that fits the first convex portion, where the first convex portion can be embedded into the first concave portion, so that the first convex portion rotatably cooperates with the first concave portion, and therefore two of the first convex portions form the first rotating shaft, thereby implementing rotating assembly between the inner frame 200 and the outer frame 100.

The inner frame 200 includes two second mounting bases 220. Correspondingly, second rotating bases 120 are respectively disposed at positions that are on an outer side wall of the lens module and are corresponding to the second mounting bases 220; one of the second mounting bases 220 corresponds to one of the second rotating bases 120; and one of the second mounting base 220 and the second rotating base 120 that correspond to each other is provided with a second convex portion, and another of the second mounting base 220 and the second rotating base 120 is provided with a second concave portion that fits the second convex portion, where the second convex portion can be embedded into the second concave portion, so that the second convex portion rotatably cooperates with the second concave portion, and therefore two of the second convex portions form the second rotating shaft, thereby implementing rotating assembly between the inner frame 200 and the lens module.

Figure 8:
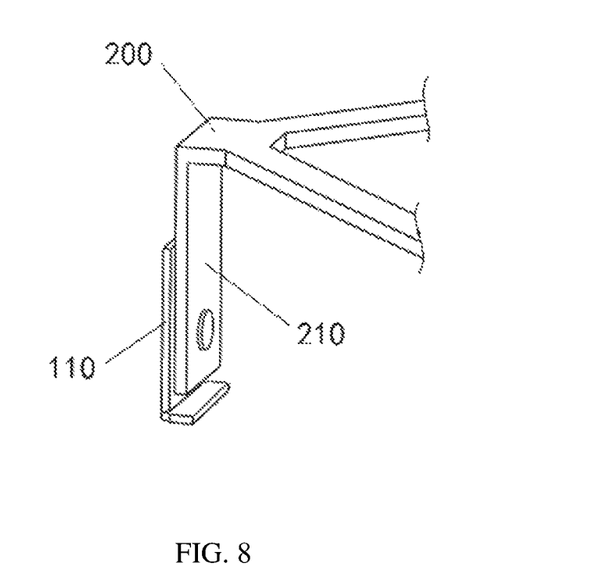
FIG. 8 is a schematic diagram of an assembly structure of a first rotating base and a first mounting base according to an embodiment of the present application.
Figure 9:
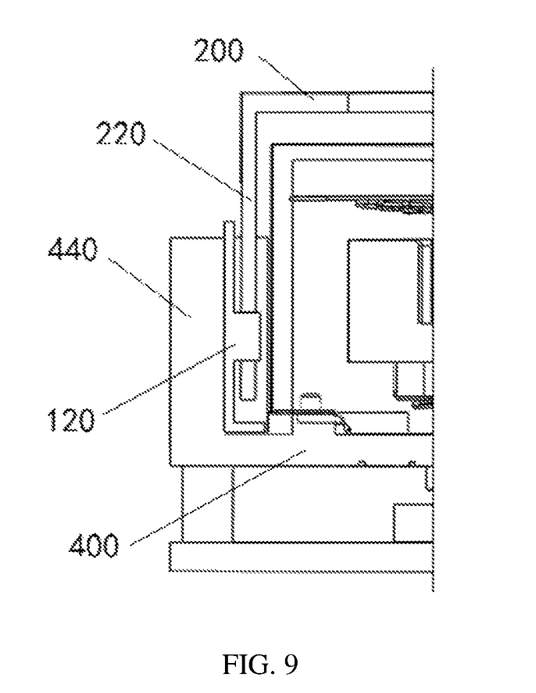
FIG. 9 is a schematic diagram of an assembly structure of a mounting portion, a second rotating base, and a second mounting base according to an embodiment of the present application.

As shown in FIG. 8 and FIG. 9, the first convex portion and the second convex portion are cylindrical; and the first concave portion and the second concave portion are blind holes or through holes. Certainly, the first convex portion and the second convex portion may also be arc-shaped protrusions; and the first concave portion and the second concave portion may be corresponding arc-shaped grooves. The embodiments of the present application do not limit shapes of the first convex portion, the second convex portion, the first concave portion, and the second concave portion.

Figure 5:
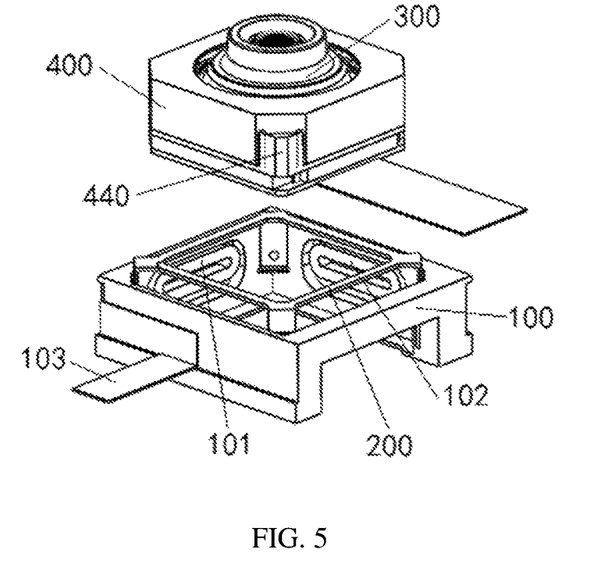
FIG. 5 is a schematic exploded view of a camera module and an anti-shake module according to an embodiment of the present application.

In addition, as shown in FIG. 5, FIG. 7, and FIG. 9, mounting portions 440 are disposed on outer walls on two sides, of the lens module, through which a rotating axis of the second rotating shaft penetrates; one end of the mounting portion 440 is connected to the lens module, and another end of the mounting portion 440 extends along the outer side wall of the lens module; a gap is present between the mounting portion 440 and the lens module; one of the second rotating bases 120 corresponds to one of the mounting portions 440; and the second rotating base 120 is located in the gap and is disposed on an inner side surface of the mounting portion 440 facing the lens module, so that the mounting portions 440 facilitate mounting and disposition of the second rotating bases 120.

The mounting portion 440 may be a plate-like structure and may also be a boss-shaped structure. The lens module may be octagonal and may also be rectangular or circular. The embodiments of the present application do not limit shapes of the mounting portions 440 and the lens module.

The embodiments of the present application further disclose an electronic device. The disclosed electronic device is provided with the camera module disclosed in the embodiments of the present application. In addition, the anti-shake module may be connected to a gyroscope and a drive chip of the electronic device to control currents in the second drive coil 101 and the first drive coil 102 in the anti-shake module. The electronic device may be an electronic device such as a smart phone, a tablet computer, or an e-book reader.

The foregoing embodiments of the present application focus on the differences between the embodiments. As long as different features of improvement in the embodiments are not contradictory, they can be combined to form a more preferred embodiment. For brevity of description, details are not described herein.

The foregoing descriptions are merely embodiments of the present application and are not intended to limit the present application. For a person skilled in the art, the present application may have various changes and variations. Any modification, equivalent replacement, or improvement made without departing from the spirit and principle of the present application shall fall within the scope of the claims of the present application.

What is claimed is:

1. A camera module for anti-shake using a drive coil, comprising a lens module and an anti-shake module, wherein the anti-shake module comprises an outer frame and a first drive component; the lens module is rotatably disposed inside the outer frame;

the first drive component comprises a first drive coil and a first magnetic element, wherein one of the first drive coil and the first magnetic element is disposed on the outer frame, and another of the first drive coil and the first magnetic element is disposed on the lens module; and the first drive coil is located in a magnetic field of the first magnetic element; and in a case that the first drive coil is energized, the lens module is able to rotate relative to the outer frame;

wherein the anti-shake module further comprises an inner frame and a second drive component, wherein the inner frame is disposed on the outer frame in a manner of rotating around a first axis, and the lens module is disposed on the inner frame in a manner of rotating around a second axis; and axes of the first axis and the second axis intersect with each other;

the second drive component comprises a second drive coil and a second magnetic element, wherein one of the second drive coil and the second magnetic element is disposed on the outer frame, and another of the second drive coil and the second magnetic element is disposed on the inner frame or the lens module; and the second drive coil is located in a magnetic field of the second magnetic element; and in a case that the second drive coil is energized, the lens module and the inner frame are able to rotate relative to the outer frame;

wherein the second magnetic element and the first magnetic element are disposed on the lens module, and the second magnetic element and the first magnetic element are located on a same side of the first axis and are located on two sides of the second axis; or the second magnetic element and the first magnetic element are located on a same side of the second axis and are located on two sides of the first axis.

2. The camera module according to claim 1, wherein the lens module comprises a lens and a third drive component, wherein the lens is movably disposed in the third drive component, and the lens is able to adjust a focal length of the lens by using the third drive component.

3. The camera module according to claim 2, wherein the third drive component comprises a third drive coil and a fourth drive coil; the second magnetic element and the first magnetic element are disposed on two sides of the lens and have spacings for moving from the lens respectively; the third drive coil and the fourth drive coil are disposed on an outer wall of the lens; and the third drive coil is located on a side facing the second magnetic element, and the fourth drive coil is located on a side facing the first magnetic element.

4. The camera module according to claim 3, wherein the first magnetic element comprises a first magnetic portion and a second magnetic portion with reverse magnetic poles, wherein an N pole of the first magnetic portion and an S pole of the second magnetic portion respectively face coil portions that have reverse electron migration directions and are of the first drive coil when the first drive coil is energized, and an S pole of the first magnetic portion and an N pole of the second magnetic portion respectively face coil portions that have reverse electron migration directions and are of the fourth drive coil when the fourth drive coil is energized; and the second magnetic element comprises a third magnetic portion and a fourth magnetic portion with reverse magnetic poles, wherein an N pole of the third magnetic portion and an S pole of the fourth magnetic portion respectively face coil portions that have reverse electron migration directions and are of the second drive coil when the second drive coil is energized, and an S pole of the third magnetic portion and an N pole of the fourth magnetic portion respectively face coil portions that have reverse electron migration directions and are of the third drive coil when the third drive coil is energized.

5. The camera module according to claim 3, wherein the third drive component further comprises a housing, wherein the housing comprises an accommodating cavity and an opening that communicates with the accommodating cavity; one end of the lens is located in the accommodating cavity, and another end of the lens is telescopically disposed in the opening; a photosensitive chip and a circuit board are disposed on a side of the lens away from the opening; the photosensitive chip is disposed on the circuit board and faces the lens; the second magnetic element and the first magnetic element are disposed on an inner side wall of the accommodating cavity; and windows are respectively opened at positions that are on side surfaces of the housing and are corresponding to the second magnetic element and the first magnetic element.

6. The camera module according to claim 5, wherein the circuit board is provided with a first printed circuit board, and the first printed circuit board is a flexible printed circuit board and is folded and bent to an S shape.

7. The camera module according to claim 1, wherein the camera module further comprises an angle detection module, and the angle detection module is configured to detect a rotation angle of at least one of the inner frame or the lens module.

8. The camera module according to claim 7, wherein the angle detection module comprises a first sensor and a second sensor that are configured to detect the inner frame and the lens module respectively; and one of the first sensor and the second sensor is disposed on the first drive coil, and another of the first sensor and the second sensor is disposed on the second drive coil.

9. The camera module according to claim 1, wherein the inner frame comprises two first mounting bases; first rotating bases are respectively disposed at positions that are on an inner side wall of the outer frame and are corresponding to the first mounting bases; one of the first mounting bases corresponds to one of the first rotating bases; one of the first mounting base and the first rotating base is provided with a first convex portion, and another of the first mounting base and the first rotating base is provided with a first concave portion that fits the first convex portion; the first convex portion is embedded into the first concave portion and rotatably cooperates with the first concave portion; and two of the first convex portions form the first axis; and the inner frame comprises two second mounting bases; second rotating bases are respectively disposed at positions that are on an outer side wall of the lens module and are corresponding to the second mounting bases; one of the second mounting bases corresponds to one of the second rotating bases; one of the second mounting base and the second rotating base is provided with a second convex portion, and another of the second mounting base and the second rotating base is provided with a second concave portion that fits the second convex portion; the second convex portion is embedded into the second concave portion and rotatably cooperates with the second concave portion; and two of the second convex portions form the second axis.

10. The camera module according to claim 9, wherein the first convex portion and the second convex portion are cylindrical, and the first concave portion and the second concave portion are blind holes or through holes.

11. The camera module according to claim 9, wherein mounting portions are disposed on outer walls on two sides, of the lens module, through which a rotating axis of the second axis penetrates; one end of the mounting portion is connected to the lens module, and another end of the mounting portion extends along the outer side wall of the lens module; a gap is present between the mounting portion and the lens module; one of the second rotating bases corresponds to one of the mounting portions; and the second rotating base is located in the gap and is disposed on an inner side surface of the mounting portion facing the lens module.

12. An electronic device, comprising a camera module for anti-shake using a drive coil, wherein the camera module comprises a lens module and an anti-shake module, the anti-shake module comprises an outer frame and a first drive component; the lens module is rotatably disposed inside the outer frame;

the first drive component comprises a first drive coil and a first magnetic element, wherein one of the first drive coil and the first magnetic element is disposed on the outer frame, and another of the first drive coil and the first magnetic element is disposed on the lens module; and the first drive coil is located in a magnetic field of the first magnetic element; and in a case that the first drive coil is energized, the lens module is able to rotate relative to the outer frame;

wherein the anti-shake module further comprises an inner frame and a second drive component, wherein the inner frame is disposed on the outer frame in a manner of rotating around a first axis, and the lens module is disposed on the inner frame in a manner of rotating around a second axis; and axes of the first axis and the second axis intersect with each other;

the second drive component comprises a second drive coil and a second magnetic element, wherein one of the second drive coil and the second magnetic element is disposed on the outer frame, and another of the second drive coil and the second magnetic element is disposed on the inner frame or the lens module; and the second drive coil is located in a magnetic field of the second magnetic element; and in a case that the second drive coil is energized, the lens module and the inner frame are able to rotate relative to the outer frame;

wherein the second magnetic element and the first magnetic element are disposed on the lens module, and the second magnetic element and the first magnetic element are located on a same side of the first axis and are located on two sides of the second axis; or the second magnetic element and the first magnetic element are located on a same side of the second axis and are located on two sides of the first axis.

13. The electronic device according to claim 4, wherein the lens module comprises a lens and a third drive component, wherein the lens is movably disposed in the third drive component, and the lens is able to adjust a focal length of the lens by using the third drive component.

14. The electronic device according to claim 13, wherein the third drive component comprises a third drive coil and a fourth drive coil; the second magnetic element and the first magnetic element are disposed on two sides of the lens and have spacings for moving from the lens respectively; the third drive coil and the fourth drive coil are disposed on an outer wall of the lens; and the third drive coil is located on a side facing the second magnetic element, and the fourth drive coil is located on a side facing the first magnetic element.

15. The electronic device according to claim 12, wherein the camera module further comprises an angle detection module, and the angle detection module is configured to detect a rotation angle of at least one of the inner frame or the lens module.

16. The electronic device according to claim 12, wherein the inner frame comprises two first mounting bases; first rotating bases are respectively disposed at positions that are on an inner side wall of the outer frame and are corresponding to the first mounting bases; one of the first mounting bases corresponds to one of the first rotating bases; one of the first mounting base and the first rotating base is provided with a first convex portion, and another of the first mounting base and the first rotating base is provided with a first concave portion that fits the first convex portion; the first convex portion is embedded into the first concave portion and rotatably cooperates with the first concave portion; and two of the first convex portions form the first axis; and the inner frame comprises two second mounting bases; second rotating bases are respectively disposed at positions that are on an outer side wall of the lens module and are corresponding to the second mounting bases; one of the second mounting bases corresponds to one of the second rotating bases; one of the second mounting base and the second rotating base is provided with a second convex portion, and another of the second mounting base and the second rotating base is provided with a second concave portion that fits the second convex portion; the second convex portion is embedded into the second concave portion and rotatably cooperates with the second concave portion; and two of the second convex portions form the second axis.

17. The electronic device according to claim 14, wherein the first magnetic element comprises a first magnetic portion and a second magnetic portion with reverse magnetic poles, wherein an N pole of the first magnetic portion and an S pole of the second magnetic portion respectively face coil portions that have reverse electron migration directions and are of the first drive coil when the first drive coil is energized, and an S pole of the first magnetic portion and an N pole of the second magnetic portion respectively face coil portions that have reverse electron migration directions and are of the fourth drive coil when the fourth drive coil is energized; and the second magnetic element comprises a third magnetic portion and a fourth magnetic portion with reverse magnetic poles, wherein an N pole of the third magnetic portion and an S pole of the fourth magnetic portion respectively face coil portions that have reverse electron migration directions and are of the second drive coil when the second drive coil is energized, and an S pole of the third magnetic portion and an N pole of the fourth magnetic portion respectively face coil portions that have reverse electron migration directions and are of the third drive coil when the third drive coil is energized.

18. The electronic device according to claim 14, wherein the third drive component further comprises a housing, wherein the housing comprises an accommodating cavity and an opening that communicates with the accommodating cavity; one end of the lens is located in the accommodating cavity, and another end of the lens is telescopically disposed in the opening; a photosensitive chip and a circuit board are disposed on a side of the lens away from the opening; the photosensitive chip is disposed on the circuit board and faces the lens; the second magnetic element and the first magnetic element are disposed on an inner side wall of the accommodating cavity; and windows are respectively opened at positions that are on side surfaces of the housing and are corresponding to the second magnetic element and the first magnetic element.

19. The electronic device according to claim 18, wherein the circuit board is provided with a first printed circuit board, and the first printed circuit board is a flexible printed circuit board and is folded and bent to an S shape.

20. The electronic device according to claim 16, wherein the first convex portion and the second convex portion are cylindrical, and the first concave portion and the second concave portion are blind holes or through holes.

* * * * *